United States Patent [19]

Towne et al.

[11] Patent Number: 4,998,446

[45] Date of Patent: Mar. 12, 1991

[54] MOUNTING ARRANGEMENT FOR TRANSMISSION SHIFT CABLES

[75] Inventors: Raymond A. Towne, Canton; Robert T. Snow, Farmington Hills; Harry J. Preseby, Fair Haven, all of Mich.

[73] Assignee: Chrysler Corporation, Highland Park, Mich.

[21] Appl. No.: 455,672

[22] Filed: Dec. 22, 1989

[51] Int. Cl.⁵ .................... G05G 9/00; F16B 7/04
[52] U.S. Cl. .................... 74/473 R; 74/475; 74/502.2; 74/502.5; 74/502.6; 403/391; 403/396
[58] Field of Search ............ 74/502.4–502.6, 74/475, 473 R; 403/390, 391, 396

[56] References Cited

U.S. PATENT DOCUMENTS

| | | | |
|---|---|---|---|
| 3,248,684 | 4/1966 | Hubbard et al. | 403/391 |
| 3,515,398 | 6/1970 | Thompson | 403/391 |
| 3,553,351 | 1/1971 | Lindsey | 403/391 |
| 4,245,521 | 1/1981 | Osborn | 74/473 R |
| 4,273,465 | 1/1981 | Schoen | 403/391 |
| 4,541,300 | 9/1985 | Kwiatkowski et al. | 74/473 R |
| 4,693,135 | 9/1987 | LaRocca et al. | 74/473 R |

Primary Examiner—Leslie A. Braun
Assistant Examiner—Winnie Yip
Attorney, Agent, or Firm—Edward P. Barthel

[57] ABSTRACT

A two-piece cable mounting arrangement is provided for a vehicle gearshift mechanism support base comprising an upper-half section and a bottom-half section of molded synthetic plastic material adapted to receive a pair of tubular cable guides end fittings therebetween. An upstanding bolt is fixed to the support base and extends through a central boss integral with the bottom-half section. The bottom-half section includes a pair of support blocks having concave troughs cradling an associated end fitting on either side of the boss. The upper-half section has a central wall portion receiving the bolt therethrough whereby the wall portion rests on the boss. The wall portion is formed with a pair of downwardly facing concave half-circle sectioned shell portions matching the pair of concave troughs such that each end fitting is captured between its associated lower trough and upper shell portions. The wall portion has an undercut locating notch interlocking with an upstanding tongue portion of the base. The half-sections are readily secured to the base by a nut and bolt to retain the end fittings in a resiliently biased axially floating manner thereby obviating the passage of sound and vibration from the vehicle drive line to the gearshifting mechanism.

6 Claims, 3 Drawing Sheets

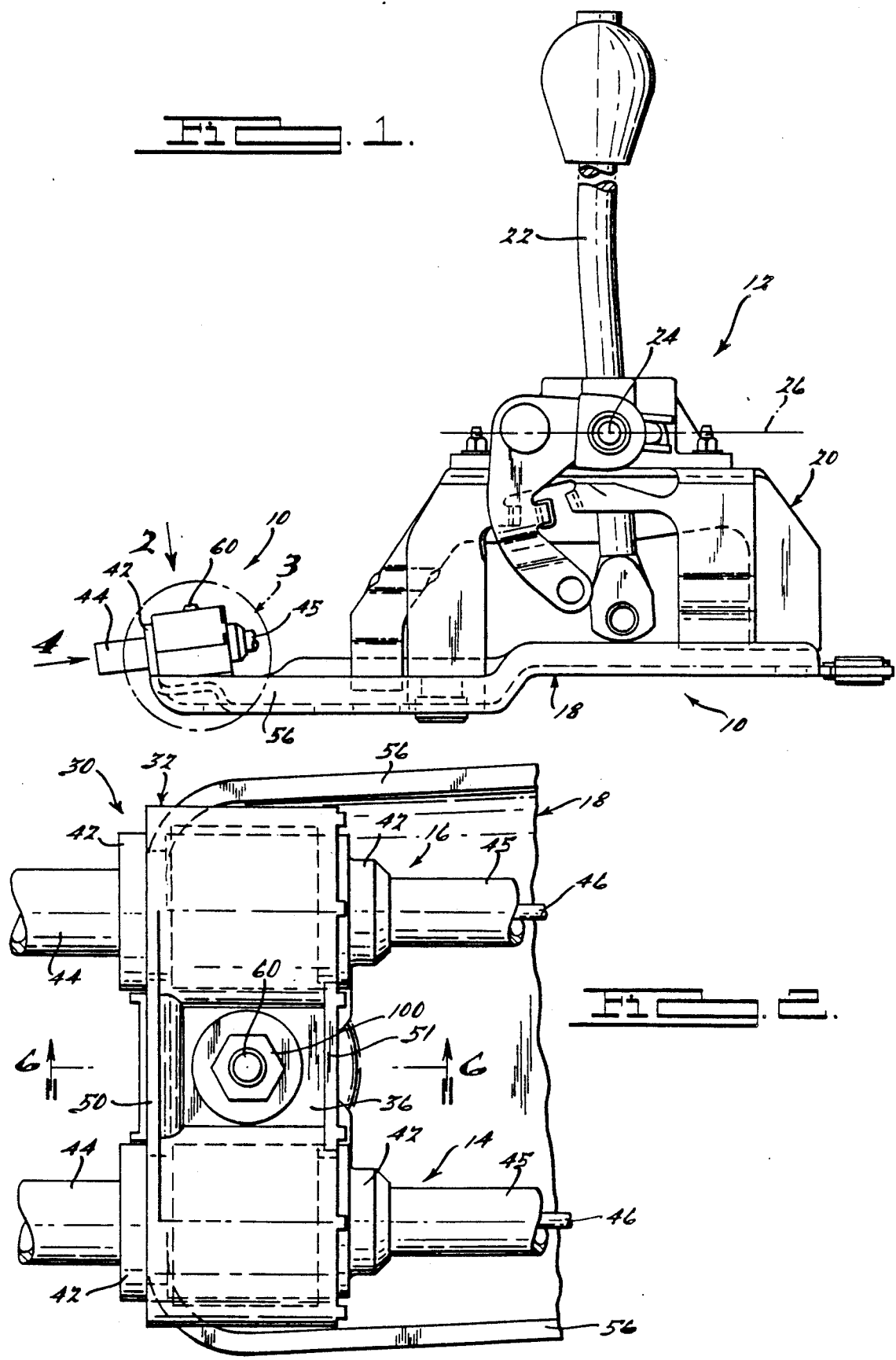

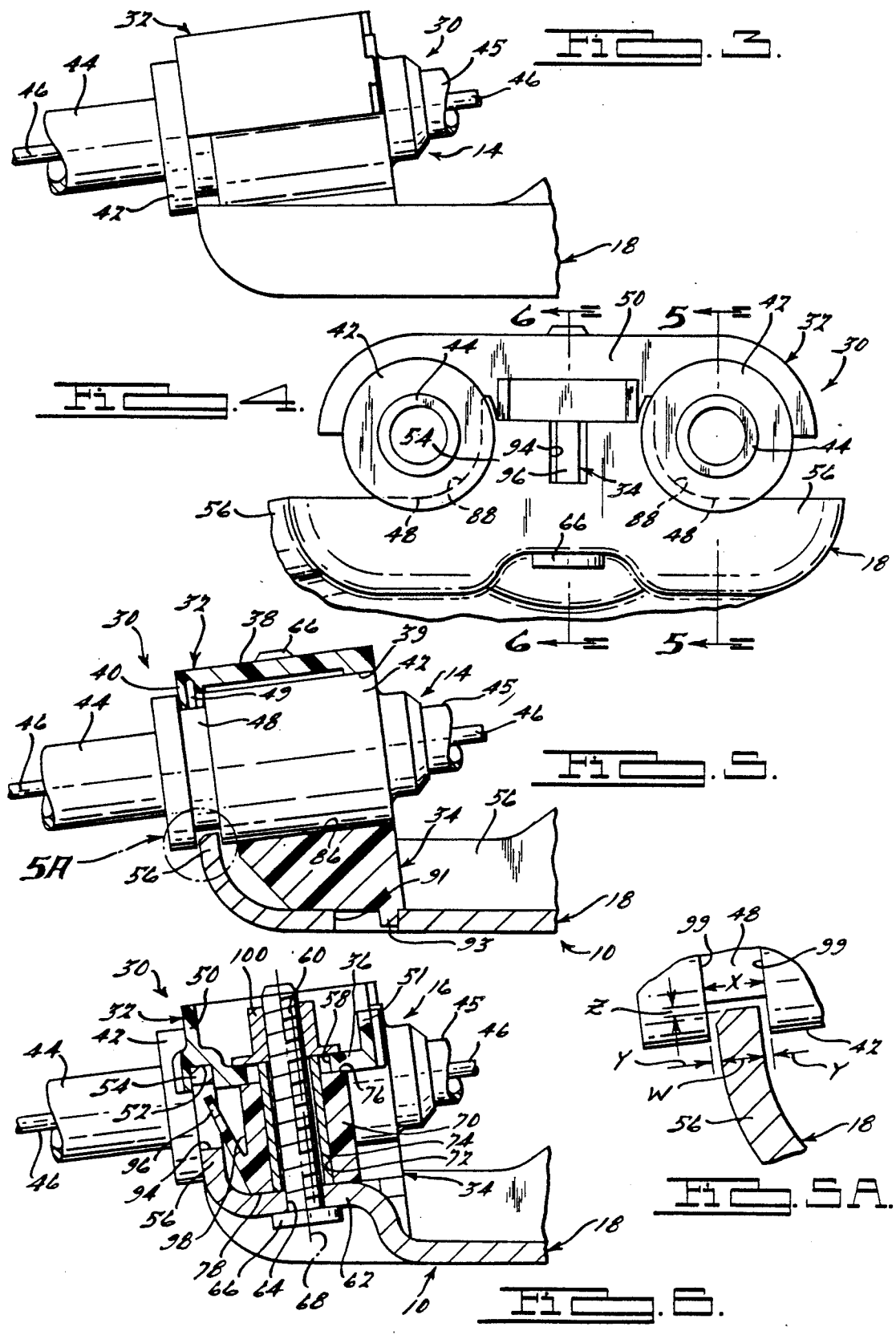

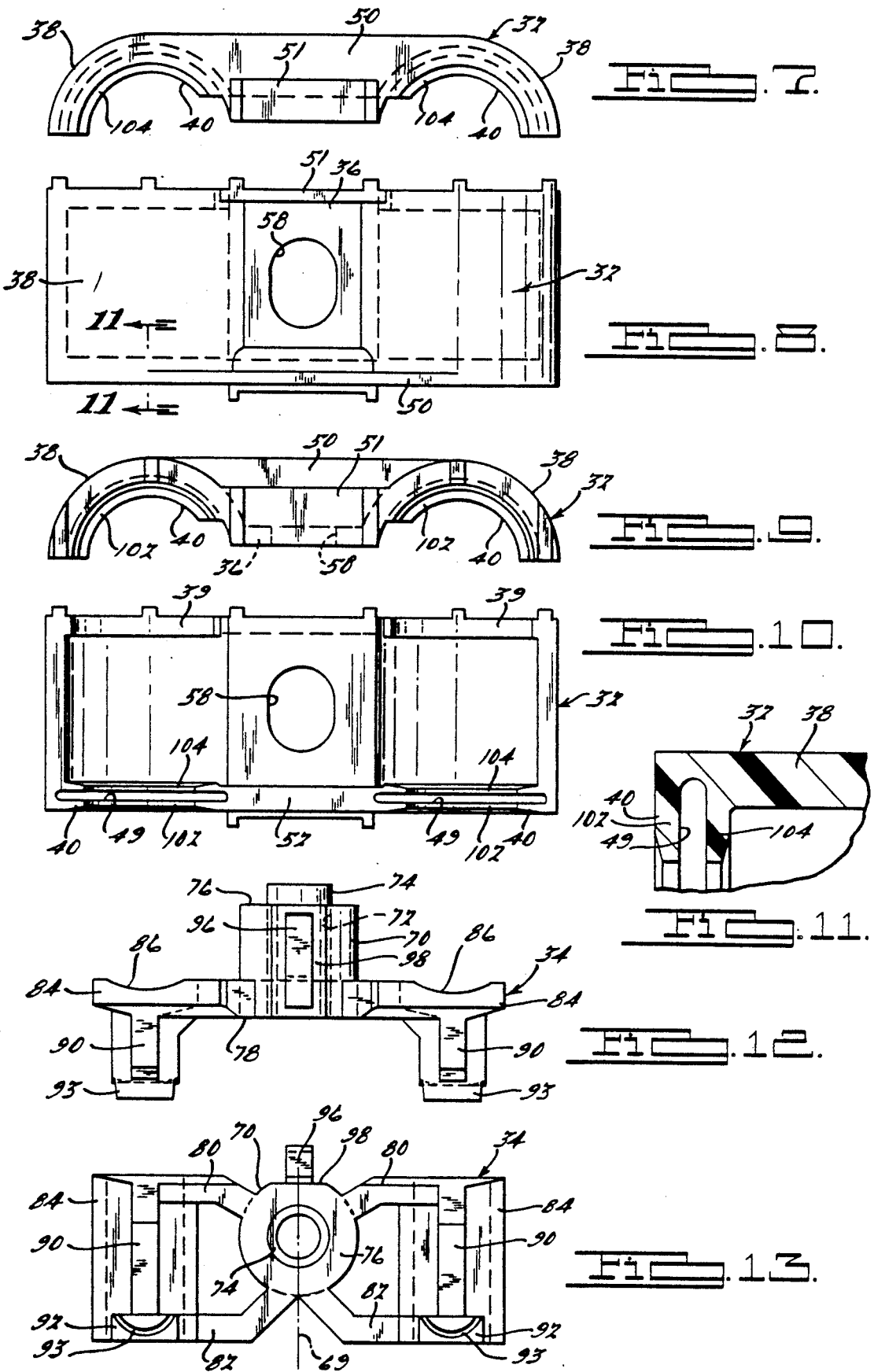

4,998,446

MOUNTING ARRANGEMENT FOR TRANSMISSION SHIFT CABLES

BACKGROUND OF THE INVENTION

This invention relates to gearshifting mechanisms and, more particularly, to an improved mounting arrangement for attaching gearshift actuator cables to a gearshift support structure.

It is of course well known to provide manually operable gearshift mechanisms for supporting a pair of gear selector components and displacing corresponding gearshift cable actuators thereby to achieve gear changes in a transmission. An example of manually operable cable gearshift actuators is shown in U.S. Pat. No. 4,541,300 issued to Kwiatkowski et al. In Kwiatkowski, pivotal movements of the gear selector components are achieved through an operating lever attached to a second gear selector component, and pivotal movement of two gear selector components to a plurality of different positions relative to the support and to one another results in generally linear displacements of a pair of side-by-side gearshift actuator cables.

The U.S. Pat. No. 4,693,135 issued to LaRocca et al. discloses a shifter support wall portion provided with openings receiving cable guide components. One opening has a slot receiving and supporting a U-shaped grommet clip including a cable guide component having a sliding fit with upwardly extending legs of the clip whereby the guide component is movable upwardly and downwardly relative to the clip.

SUMMARY OF THE INVENTION

It is a principal object of the invention to provide a new and improved two-piece mounting arrangement for readily attaching a pair of longitudinally extending side-by-side cable guide conduit tubular end fittings therebetween to the gearshift base support to reduce axial mechanical stress on the engaged end fittings.

It is also an object of the present invention to provide a two-piece mounting arrangement as set forth above wherein said arrangement comprises upper and lower matchable half sections of molded synthetic plastic material adapted to be readily assembled to the support structure with the pair of cable actuator end fittings secured therebetween by means of a single upstanding threaded fastener.

It is another object of the present invention to provide a two-piece mounting arrangement as set forth above wherein the upper-half section is formed with an undercut locating groove engageable with the free edge of an upstanding support base flange such that the mounting arrangement and its associated pair of cable actuators are positioned in a predetermined manner.

It is yet another object of the present invention to provide a two-piece mounting arrangement as set forth above wherein the pair of end fittings are captured between the upper and lower plastic half sections in a sound and vibration isolating and manner with the cable actuators subjected to reaction loadings below a predetermined value and whereby upon the reaction loadings exceeding the predetermined value the reaction loadings are positively grounded out to the steel support base.

BRIEF DESCRIPTION OF THE DRAWINGS

Further features and advantages of the invention will become apparent to those skilled in the art upon reference to the following description and accompanying drawings in which:

FIG. 1 is a side elevational view of a gearshift mechanism incorporating the present invention;

FIG. 2 is an enlarged fragmentary top elevational view of the forward portion of the gearshift mechanism of FIG. 1 looking in the direction of the arrow denoted FIG. 2;

FIG. 3 is an enlarged fragmentary view of the area within the dashed line circle denoted "3" in FIG. 1;

FIG. 4 is an enlarged fragmentary front elevational view of the mechanism of FIG. 1 looking in the direction of the arrow denoted "4";

FIG. 5 is a vertical sectional view, partly in elevation, taken generally on the line 5—5 of FIG. 4;

FIG. 5A is an enlarged fragmentary view of the area within the dashed-line circle denoted FIG. 5A in FIG. 5;

FIG. 6 is a vertical sectional view, partly in elevation, taken generally on the line 6—6 of FIG. 4;

FIG. 7 is a front elevational detail view of the mounting arrangement upper-half section;

FIG. 8 is a top elevational detail view of the mounting arrangement upper-half section;

FIG. 9 is a rear elevational detail view of the mounting arrangement upper-half section;

FIG. 10 is an elevational view of the underside of the mounting arrangement upper-half section;

FIG. 11 is an enlarged fragmentary vertical sectional view taken on the line 11—11 of FIG. 8;

FIG. 12 is a front elevational detail view of the mounting arrangement lower-half section; and FIG. 13 is top elevational detail view of the mounting arrangement lower-half section inner surface.

DETAILED DESCRIPTION OF THE DRAWINGS

Referring now to the drawings and in particular to FIGS. 1 and 2 there is shown a gearshifting mechanism according to the present invention comprising a support base 10, a gearshifting mechanism 12, and a pair of gearshift actuator cable assemblies 14 and 16. The support base 10 is of sheet metal construction and is comprised of a bottom member 18 and a top member 20. The gearshift selector mechanism includes a gearshift lever 22 mounted on the upper end of top member 20 for pivotal movement about a first axis 24 extending laterally of the support base and a second axis 26 extending longitudinally of the support base and which is perpendicular to and intersects the first axis 24. The details of the gearshifting mechanism forms not part of the present invention and reference may be had to U.S. Pat. No. 4,245,521 issued to Osborn for a description of a typical mechanism. The disclosure of the Osborn patent is incorporated by reference herein.

As best seen in FIGS. 2-6, the two-piece cable mounting arrangement of the present invention is indicated generally at 30 and is adapted to secure the pair of gearshift actuators 14 and 16 to the support base 10. With reference to FIG. 5 the two-piece mounting arrangement is symmetrical about a longitudinally extending, vertically disposed plane which includes the section line 6—6 in FIG. 4. The mounting arrangement comprises an upper-half cover section 32 and a lower-half base section 34 supported in a vertically spaced manner at the forward end of the support base 10. The upper-half cover section 32, molded of synthetic plastic material, generally rectangular in outline and comprises a top central wall portion 36 interconnecting a pair of spaced apart half-round upper shell structures 38 having an arcuate inner surface aft rib portion 39 (FIGS. 5 and 10). Each half-round shell structure arcuate inner surface aft rib portion 39 extends over one-half or about 180° of the circumference of its associated conduit end fitting 42.

With reference to FIG. 5 it will be seen that each shell 38 is cylindrical in shape and has a forward internal biasing rib 40 coextensive with its shell leading edge. It will be noted that the shell's associated gearshift actuator 14 comprises an outer metal cylindrically tubular conduit end fitting 42 including a smaller diameter forwardly projecting portion 44 through which the cable core 46 extends. A rearwardly extending metal cable support tube 45 supports the rearward portion of the cable core 46 for connection with a corresponding transmission operating member (not shown). The forward end of each conduit end fitting 42 is provided with a circumferential rectangular-sectioned groove 48 sized for the snug reception therein of its associated arcuate half-circle biasing rib 40 in a manner to be explained. As best seen in FIG. 11 that each biasing rib 40 is provided with an internal medial slot 49 formed continuous therewith. The internal medial slot 49 provides a resilient cushion between the upper-half section 32 and the cable end fitting 42 thereby dampening-out the travel of any drive line sounds and vibrations transmitted by the cable's actuator assemblies 14 and 16 to the gearshifting mechanism 12.

As viewed in FIG. 6 the upper-half cover section 32 has its central wall portion 36 provided with upstanding transverse forward gusset 50 and upstanding transverse rear gusset 51. The juncture of the forward gusset 50 with the wall portion 36 defines a linear transversely extending undercut locating notch 52. The undercut locating notch 52 is adapted to snugly receive the upper edge of a vertically disposed transversely extending central tongue portion 54. The upstanding tongue portion 54 is an integral extension of base support peripheral flange 56 shown in FIG. 2 extending around the front and sides of the support base 10. It will be seen in FIGS. 8 and 10 that the upper-half section central upper wall 36 has a longitudinally elongated oversize opening 58 formed therein adapted to receive a threaded fastener 60 therethrough.

With reference to FIG. 6 the threaded fastener 60 is shown extending vertically upwardly oriented at right angles from the plane of a forwardly and downwardly sloped raised base portion 62. It will be noted that the raised base portion 62 is offset upwardly from the support base bottom member 18. The fastener 60 extends through hole 64 in the base portion 62 with fastener head 66 anchored to the undeside of the base portion. The fastener principal axis is disposed normal to the raised base portion 62 such that its principal axis 68 is canted forwardly at a slight acute angle from the vertical.

As best seen in FIGS. 6 and 12 the lower half base section 34, symmetrical about a longitudinally extending vertically disposed plane defined by dashed construction 69 in FIG. 13, comprises a central upstanding boss or column 70 formed with an axial bore 72. A metal sleeve 74 is positioned in the bore 72 and projects upwardly a determined distance above upper end face 76 of the column 70. The column lower end face 78 is seated on the base portion 62 and is integrally molded with laterally projecting fore and aft arms 80 and 82 respectively, supporting at their outboard ends a pair of support structures or blocks 84.

The upper surface of each support block 84 is formed with a longitudinally extending arcuate upwardly facing concave saddle or furrow 86 having a radius of curvature complementary to the cylindrical surface of the conduit end fitting 42. The furrow extends over about 60° of the circumference of the conduit end fitting 42. Thus, as seen in FIGS. 4 and 5, each conduit end fitting 42 is received in a nested manner in its associated furrow 86 with its circumferential groove 48 sized to receive therein conforming radiused fillet edge 88 formed between the center tongue portion 54 and its adjacent upstanding base flanges 56. FIGS. 5, 12 and 13 show each of the support blocks formed with longitudinally extending leg portions 90 joined to transverse leg portions 92 adapted to support the lower-half section 34 on the transmission gear shifter base portion 18. It will be noted in FIGS. 5 and 13 that each leg portion 92 is molded with a downwardly projecting half-round detent 93 adapted to be received in a conforming opening 91 in bottom member 18.

It will be noted in FIGS. 4 and 6 that the center tongue portion 54 has an upwardly extending rectangular shaped central window 94 formed therethrough. The window is sized to lockingly engage a resilient snap-action finger 96. The finger 96 is integrally molded at its lower end to a forward transverse flat 98 of the column 70 so as to normally project forwardly and upwardly at an acute angle from the flat. During installation, upon the lower-half section 34 having its sleeve 74 being telescoped downwardly on the fastener 60, the finger 96 is adapted to be resiliently flexed inwardly in a cam like manner by the upper edge of the base structure tongue portion 54. The finger 96 retains the lower-half section 34 during handling before the actuator assemblies 14 and 16 are attached. As the column lower end face 78 seats on the base portion 62 the finger 96 snaps forwardly to its FIG. 6 position wherein it lockingly engages the window 94. To remove the lower-half section 34 the installer merely depress the finger 96 inwardly with a screwdriver to unlock the section 34 so that it may be lifted off the fastener 60.

With the lower-half section 34 locked in place on the support base 18 the pair of cable actuators 14 and 16 have their conduit end fittings 42 nested on their associated furrows 86 with their grooves 48 locked on the radiused fillets 88. The upper half section 32 is disposed above the lower-half section 34 with each of its half round shell structures 38 overlying an associated one of the cable conduit end fitting 42 and the fastener 60 upper end projecting through its wall portion aperture 58. Upon the tongue portion upper edge 54 engaging the undercut notch 52 and the shell internal biasing ribs 40 being seated in the upper curved portion of their associated cable conduit end fitting exterior grooves 48 a nut 100 is torqued down on the threaded fastener 60 to secure the pair of cable conduit end fittings 42 on the support base 10. It will be seen in FIG. 6 that nut 100 bottoms on sleeve 74, preventing crushing of sections 32 and 34.

It will be noted in FIG. 5A that the base support front upstanding flange 56 has a thickness "W" that is a predetermined distance less than the width "X" between radial internal side faces 99 of the end fitting groove 48. The result is that upon each biasing rib 40 being snugly received in its associated end fitting groove 48, predetermined forward and rear axial clearances "Y" are provided between the flange 56 and each groove side face 99 together with a predetermined radial clearance "Z".

FIG. 11 shows the biasing rib slot 49 defining bifurcated resilient pairs of forward 102 and rear 104 half-circle rib sectors. The rib sectors 102 and 104 are shown in their neutral mode without any axial loading of the actuator cable core 46. Each of the biasing ribs 40 are designed with a selected load/deflection rate operative to dampen axial reaction actuator assembly cable loads on each conduit end fitting 42 below a predetermined maximum value to obviate metal to metal contacting surfaces. Thus, in its neutral mode FIG. 5A shows the determined dampening clearance spaces "Y" provided between the respective opposed forward and rear radial internal side faces 99 of its associated end fitting circumferential groove 48.

In operation, upon the predetermined axial gearshift actuator cable assembly reaction load on each conduit end fitting 42 being exceeded, each biasing rib sector 102 and 104 resiliently deflects so as to allow each conduit end fitting 42 to move in an opposite axial direction through its clearance "Y" whereby a respective one circumferential groove radial face 99 contacts its opposed forward or rear surface of the upstanding flange 56. In this way metal to metal contacting forward and rear positions are provided to positively ground-out reaction loads exceeding the above mentioned predetermined maximum value for dampened loads.

While a specific embodiment of the invention has been shown and described in detail to illustrate the application of the principle of the invention, it will be understood that the invention may be embodied in other forms without departing from such principles.

What is claimed is:

1. A two-piece molded synthetic plastic mounting arrangement for securing a pair of identical side-by-side actuator cable assembly conduit metal end fittings to a vehicle drive train component provided with a metal support base having an upstanding peripheral flange formed with edge portions, each said conduit end fitting having a circumferential groove formed therein, said mounting arrangement comprising:

a threaded fastener extending vertically upwardly from said support base, said fastener spaced a predetermined longitudinal distance from said base upstanding flange;

said two-piece cable mounting arrangement comprising an upper-half section and a lower-half section, said lower-half section being generally rectangular in plan and formed with a central upstanding integral column portion having an upper end, a through bore aligned on the principal axis of said column portion adapted to receive said fastener therethrough, integral retaining finger means formed on said lower-half section adapted for engagement with window means in said support base upstanding flange;

said lower-half section molded with a pair of upwardly facing longitudinally extending laterally spaced apart arcuate furrows symmetrically formed on either side of said column portion for nested reception thereon of an associated one of said conduit end fittings, whereby a portion of each said conduit end fitting circumferential groove engaging therein an associated conforming one of said support base upstanding flange edge portions;

said upper-half section formed with a central horizontally extending wall portion interconnecting a pair of integral laterally spaced apart shell portions, each said shell portion molded with a downwardly facing arcuate inner surface portion such that each furrow in said lower-half section faces the corresponding arcuate inner surface portion of said upper-half section associated shell portion for receiving in a complemental manner one of said conduit end fittings therebetween;

said upper-half section central wall portion having a longitudinally elongated opening therein aligned to receive said fastener therethrough with said central wall portion supported on said column portion upper end, a central tongue portion extending upwardly from said support base flange defining a free upper edge, locating notch means integrally formed on said upper-half section adapted to snugly receive therein said central tongue portion upper free edge;

whereby upon a nut being threaded on said fastener said pair of end fittings being releasably captured by said mounting arrangement on said support base.

2. The mounting arrangement as set forth in claim 1, wherein said locating notch comprising a transverse undercut notch molded integral with said upper-half section central wall portion.

3. The mounting arrangement as set forth in claim 1, wherein each said upper-half section shell portion arcuate inner surface portion extends over about 180° of the circumference of its associated conduit end fitting.

4. The mounting arrangement as set forth in claim 1, wherein each said upper-half section shell portion providing a cylindrical shell structure molded with an internal half-circle biasing rib adjacent its forward end adapted for conforming insertion in its associated end-fitting circumferential groove;

each said biasing rib provided with a coextensive medial open ended slot defining bifurcated resilient forward and rear half-circle rib sectors sized to snugly engage its associated end-fitting groove so as to normally resiliently retain its associated conduit end-fitting in an axially disposed neutral mode, each said biasing rib having a predetermined load/deflection rate to dampen reaction loads below a predetermined maximum value.

5. The mounting arrangement as set forth in claim 4, wherein in said neutral mode said support base upstanding flange having a predetermined thickness such that a clearance is provided between its forward and rear surfaces and the respective opposed forward and rear radial internal side faces of its associated end fitting circumferential groove, and whereby upon the predetermined maximum value axial reaction load on each said end fitting being exceeded an associated biasing rib sector resiliently deflecting, allowing each said conduit end fitting to move in an axial direction whereby its respective circumferential groove radial internal side face contacts the opposed surface of said base support upstanding flange.

6. A two-piece molded synthetic plastic mounting arrangement for securing a pair of identical side-by-side actuator cable assembly conduit metal end fittings to a vehicle drive train component provided with a metal support base having an upstanding peripheral flange formed with edge portions, each said conduit end fitting having a circumferential groove formed therein, said mounting arrangement comprising:

a threaded fastener extending vertically upwardly from said support base, said fastener spaced a predetermined longitudinal distance from said base upstanding flange;

said two-piece cable mounting arrangement comprising an upper-half section and a lower-half section, said lower-half section being generally rectangular in plan and formed with a central upstanding integral column portion having a through bore adapted to receive said fastener therethrough, an integral retaining finger formed on said lower-half section adapted for engagement with window means in said support base upstanding flange;

said lower-half section molded with a pair of upwardly facing longitudinally extending laterally spaced apart arcuate furrows symmetrically formed on either side of said column portion for nested reception thereon of an associated one of said conduit end fittings, whereby a portion of each said conduit end fitting circumferential groove receives therein an associated conforming one of said support base upstanding flange edge portions;

said upper-half section formed with a central horizontally extending wall portion interconnecting a pair of integral laterally spaced apart cylindrical shell structures, each said shell structure molded with a downwardly facing arcuate inner surface portion which extends over about one-half the circumference of it associated conduit end fitting, such that each furrow in said lower-half section faces the corresponding arcuate inner surface portion of said upper-half section associated shell structure for receiving in a complemental manner one of said conduit end fittings therebetween;

said upper-half section central wall portion having longitudinally elongated opening therein aligned to receive said fastener therethrough with said central wall portion supported on said column portion upper end, a central tongue portion extending upwardly from said support base flange defining a free upper edge, a locating undercut notch molded integral with said upper-half section central wall portion adapted to snugly receive therein said central tongue portion upper free edge;

each said upper-half section cylindrical shell structure molded with an internal arcuate biasing rib adjacent its forward end adapted for conforming insertion in its associate conduit end fitting circumferential groove, each said biasing rib having a predetermined load/deflection rate to dampen-out the transmission of axial reaction cable loads on each end fitting below a predetermined maximum value;

whereby upon a nut being threaded on said fastener said pair of end fittings being releasably captured by said mounting arrangement on said support base.

* * * * *